(12) United States Patent
Rethage et al.

(10) Patent No.: US 12,374,065 B1
(45) Date of Patent: Jul. 29, 2025

(54) STRUCTURAL MODIFICATION DETECTION USING DESCRIPTOR-BASED QUERYING

(71) Applicant: HOVER INC., San Francisco, CA (US)

(72) Inventors: Dario Rethage, Kendall Park, NJ (US); Brandon Scott, San Francisco, CA (US); Manish Upendran, San Francisco, CA (US); Randy Lacasse, Haymarket, VA (US); Javier Cambon Sanjurjo, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 129 days.

(21) Appl. No.: 17/864,848

(22) Filed: Jul. 14, 2022

Related U.S. Application Data

(63) Continuation of application No. 16/926,442, filed on Jul. 10, 2020, now abandoned.
(Continued)

(51) Int. Cl.
*G06T 19/20* (2011.01)
*G06F 16/53* (2019.01)
(Continued)

(52) U.S. Cl.
CPC ............. *G06T 19/20* (2013.01); *G06F 16/53* (2019.01); *G06F 18/22* (2023.01); *G06N 3/045* (2023.01);
(Continued)

(58) Field of Classification Search
CPC . G06T 19/20; G06T 17/00; G06T 2219/2021; G06F 16/53; G06F 18/22; G06N 3/045; G06N 3/08; G06V 20/653
See application file for complete search history.

(56) References Cited

U.S. PATENT DOCUMENTS

| | | | |
|---|---|---|---|
| 6,904,423 B1 * | 6/2005 | Nicolaou | G06N 5/02 |
| | | | 702/22 |
| 7,421,445 B2 | 9/2008 | O'Neil et al. | |
| | | (Continued) | |

FOREIGN PATENT DOCUMENTS

WO    2011142093    11/2011

OTHER PUBLICATIONS

U.S. Appl. No. 62/629,449 (of US 2019/0251744) filed Feb. 12, 2018. (Year: 2018).*
(Continued)

*Primary Examiner* — Sing-Wai Wu
(74) *Attorney, Agent, or Firm* — Kilpatrick Townsend & Stockton LLP

(57) ABSTRACT

Identifying a pre-existing three-dimensional (3D) model of a target structure includes receiving at least one two-dimensional (2D) image of a target physical structure; generating a predicted 3D model of the target structure based on the at least one 2D image; generating a search descriptor of the predicted 3D model; querying a data structure storing a plurality of pre-existing descriptors, where each pre-existing descriptor characterizes a previously constructed 3D model of an associated physical structure; and identifying at least one previously constructed 3D model that is substantially similar to the predicted 3D model based on a difference between the search descriptor and the plurality of pre-existing descriptors.

19 Claims, 9 Drawing Sheets

Related U.S. Application Data

(60) Provisional application No. 63/050,002, filed on Jul. 9, 2020, provisional application No. 62/872,385, filed on Jul. 10, 2019.

(51) Int. Cl.
  *G06F 18/22* (2023.01)
  *G06N 3/045* (2023.01)
  *G06N 3/08* (2023.01)
  *G06T 17/00* (2006.01)
  *G06V 20/64* (2022.01)

(52) U.S. Cl.
  CPC .............. *G06N 3/08* (2013.01); *G06T 17/00* (2013.01); *G06V 20/653* (2022.01); *G06T 2219/2021* (2013.01)

(56) References Cited

U.S. PATENT DOCUMENTS

| | | | |
|---|---|---|---|
| 8,909,563 B1 | 12/2014 | Jing et al. | |
| 9,935,652 B1 | 4/2018 | Chalmer et al. | |
| 10,248,663 B1 * | 4/2019 | Keisler | G06F 16/29 |
| 2005/0084154 A1 | 4/2005 | Li et al. | |
| 2007/0110330 A1 * | 5/2007 | Chauville | G06T 5/90 |
| | | | 382/274 |
| 2008/0018643 A1 * | 1/2008 | Feilkas | G06T 7/50 |
| | | | 382/131 |
| 2008/0152216 A1 | 6/2008 | Meadow et al. | |
| 2011/0164826 A1 * | 7/2011 | Noguchi | G06V 10/462 |
| | | | 382/253 |
| 2017/0371897 A1 | 12/2017 | Strong et al. | |
| 2019/0251744 A1 * | 8/2019 | Flagg | G06F 18/22 |

OTHER PUBLICATIONS

U.S. Appl. No. 16/926,442, "Non-Final Office Action", Oct. 20, 2021, 23 pages.

U.S. Appl. No. 16/926,442, "Notice of Allowance", Apr. 15, 2022, 5 pages.

* cited by examiner

STRUCTURAL MODIFICATION DETECTION USING DESCRIPTOR-BASED QUERYING

CROSS-REFERENCES TO RELATED APPLICATIONS

The present application is a continuation of U.S. patent application Ser. No. 16/926,442 filed on Jul. 10, 2020, entitled "Structural Modification Detection Using Descriptor-Based Querying and Deep Learning," which is incorporated herein by reference in its entirety for all purposes. U.S. patent application Ser. No. 16/926,442 claims the priority benefit to U.S. Provisional Application No. 62/872,385, filed on Jul. 10, 2019, entitled "Geometric Assumptions When Comparing Imagery," and to U.S. Provisional Application No. 63/050,002, filed on Jul. 9, 2020, entitled "Systems and Methods for Querying Three-Dimensional (3D) Models Using Descriptors," the disclosures of each of which are incorporated herein by reference in their entirety for all purposes.

TECHNICAL FIELD

The present disclosure relates generally to enhanced querying of pre-existing 3D models of physical structures using descriptors that are generated based on structural features. More specifically, the present disclosure is related to detecting a structural modification to a physical structure using computer-vision and machine-learning techniques, and querying a database storing pre-existing 3D models to identify the pre-existing 3D model that corresponds to the physical structure before the structural modification.

BACKGROUND

Some efforts have been made to generate three-dimensional (3D) models of buildings in urban cities via aerial imagery or specialized camera-equipped vehicles. However, these 3D models have limited texture resolution and geometry quality, scale, are difficult to update, and provide no robust real-time image data analytics for various use cases. Additionally, querying a database storing the 3D models to retrieve a target 3D model often poses a technical challenge and yields inaccurate results.

SUMMARY

In some embodiments, a computer-implemented method is provided. The computer-implemented method including: storing, in a data structure, a set of descriptors, each descriptor of the set of descriptors characterizing a pre-existing 3D model of a physical structure, the set of descriptors including a target descriptor characterizing a target pre-existing 3D model of a target physical structure. The computer-implemented method also includes receiving a two-dimensional (2D) image of the target physical structure with a structural modification. The computer-implemented method also includes inferring, using a first trained neural network, that a set of pixels of the 2D image represents the target physical structure with the structural modification. The computer-implemented method also includes generating, using a second trained neural network, an inferred 3D model of the target physical structure with the structural modification. The computer-implemented method also includes generating a new descriptor for the inferred 3D model, the new descriptor representing one or more structural features of the target physical structure with the structural modification. The computer-implemented method also includes querying the data structure by determining a difference between the new descriptor and each descriptor of the set of descriptors. The computer-implemented method also includes identifying the target pre-existing 3D model based on the difference between the new descriptor and the target descriptor. The computer-implemented method also includes mapping the identified target pre-existing 3D model to the inferred 3D model, the mapping being used to identify a 3D shape representing the structural modification. The computer-implemented method also includes modifying the target pre-existing 3D model to include the 3D shape representing the structural modification. Other embodiments of this aspect include corresponding computer systems, apparatus, and computer programs recorded on one or more computer storage devices, each configured to perform the actions of the methods.

Implementations may include one or more of the following features. The computer-implemented method where generating the new descriptor further includes inputting the inferred 3D model into a third trained neural network. The computer-implemented method may also include generating, as an output of the third trained neural network, a compressed representation of the inferred 3D model, where the compressed representation is the new descriptor. The computer-implemented method where generating the new descriptor further includes receiving an image of a top-down view of the target physical structure with the structural modification. The computer-implemented method may also include extracting the one or more structural features from the image. The computer-implemented method may also include generating the new descriptor using the one or more structural features. The computer-implemented method where determining the difference between the new descriptor and the descriptor associated with each existing 3D model further includes determining, for each pre-existing 3D model, a hamming distance between the new descriptor and each descriptor of the set of descriptors. The computer-implemented method may also include determining, for each pre-existing 3D model, a similarity between the inferred 3D model and the pre-existing 3D model based on the hamming distance. The computer-implemented method where mapping the identified target pre-existing 3D model to the inferred 3D model further includes determining an overlapping metric between the target pre-existing 3D model and the inferred 3D model. The computer-implemented method may also include determining, based on the overlapping metric, that the 3D shape is not included in the target pre-existing 3D model. The target physical structure may not include the structural modification when the target pre-existing 3D model is generated. The computer-implemented method where the new descriptor includes a set of bits, and each bit of the set of bits represents a presence or absence of a primitive feature at a specific point on a building. Implementations of the described techniques may include hardware, a method or process, or computer software on a computer-accessible medium.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

DETAILED DESCRIPTION

Figure 1:
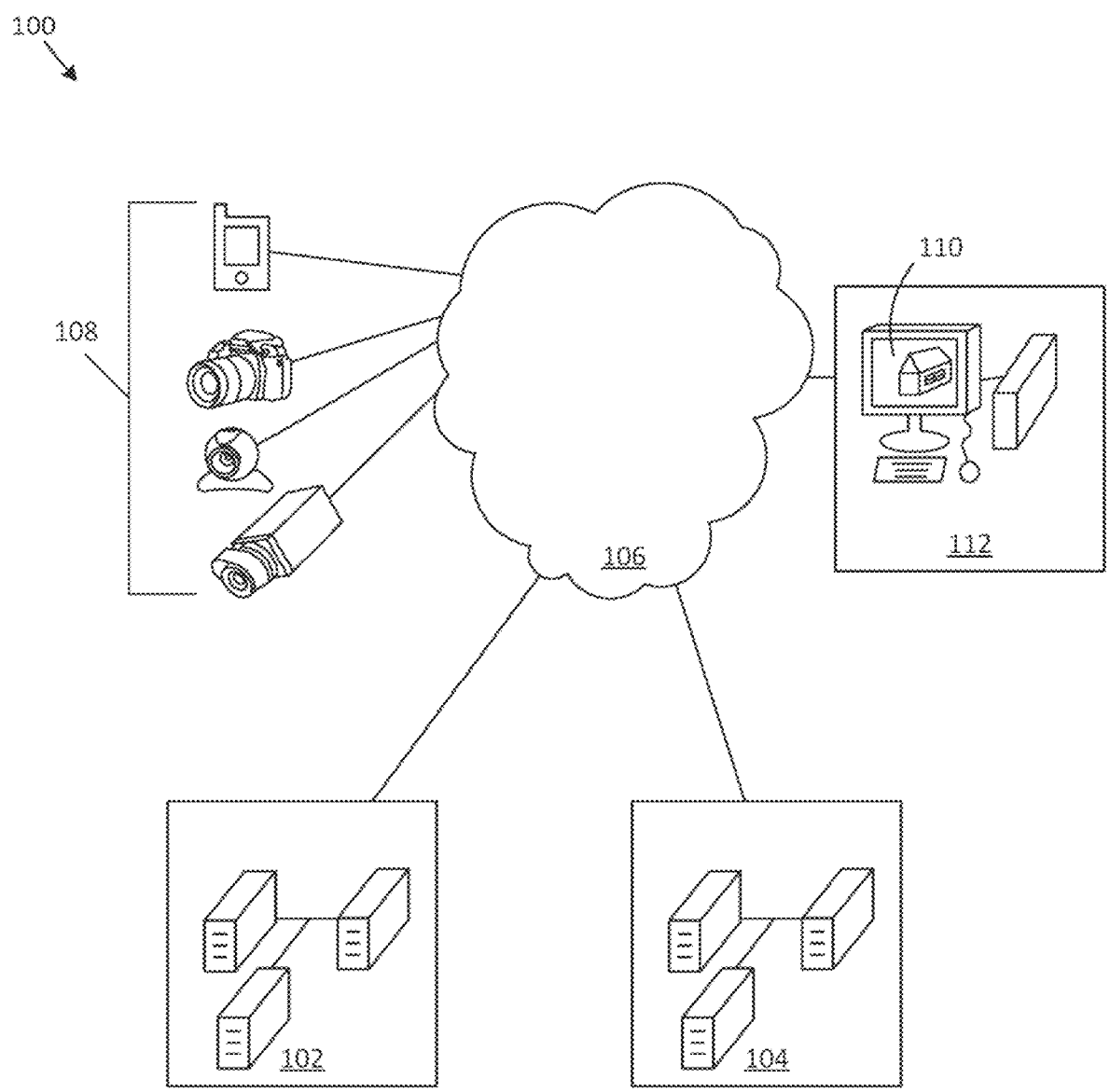
FIG. 1 illustrates one embodiment of a system architecture of a three-dimensional modeling system.

Certain aspects and features of the present disclosure relate to retrieving a target pre-existing 3D model from a database storing a set of pre-existing 3D models by querying the database using a descriptor that represents structural features of a physical structure. For example, a target pre-existing 3D model representing a target physical structure may be a 3D computer-aided design (CAD) representation of a house. The target physical structure may undergo a structural modification. A structural modification may be, for example, a new structure added to a house (e.g., a new porch), a modification made to the existing structure of a house (e.g., changing the house's design, such as expanding the size of a room), or a structure that has been removed from the house (e.g., removing a shed from the backyard of the house). Certain aspects and features of the present disclosure relate to generating a prediction of a 3D model of the target physical structure with the structural modification from a two-dimensional (2D) image using computer-vision and machine-learning techniques. A server may generate a descriptor to numerically represent certain structural features of the predicted 3D model of the target physical structure with the structural modification. The server may query the database of pre-existing 3D models using the descriptor to identify and retrieve the target pre-existing 3D model that represents the target physical structure before the structural modification was added (or removed).

To illustrate and only as a non-limiting example, a house is remodeled by adding a deck to the house. A user captures a 2D image of a remodeled house. The 2D image is uploaded to a server configured to automatically detect the structural modification (e.g., the added deck) and to update a pre-existing 3D model that represents the house before the remodel (e.g., before the deck was added) to reflect the new deck. The server analyzes the 2D image using computer-vision and machine-learning techniques to generate a prediction of a 3D model of the remodeled house. The server generates a descriptor based on the structural features of the remodeled house. The descriptor is a vector of binary values that represents the existence or absence of certain structural features. The server queries the database of pre-existing 3D models using the descriptor to identify and retrieve the pre-existing 3D model of the house before the deck was added. The server compares the predicted 3D model to the pre-existing 3D model to detect the addition of the deck, and then updates the pre-existing 3D model of the house to reflect the new deck.

In some implementations, a descriptor may be generated using an image of a top-down view of a roof of a physical structure. In other implementations, a descriptor may be generated using a synthetic (e.g., virtual) image of a top-down view of a roof of a physical structure. In yet other implementations, a descriptor may be generated based on a 3D model of a physical structure that is reconstructed from a two-dimensional (2D) image. In yet other implementations, a descriptor may be generated using machine-learning models, such as an auto-encoder neural network. Querying the database may include, but is not limited to, computing a Hamming distance between the new descriptor representing the predicted 3D model (e.g., of the remodeled house) and the descriptor associated with each pre-existing 3D model. The Hamming distance may be evaluated to identify the target pre-existing 3D model of the target physical structure before the structural modification (e.g., of the house before the remodel). If the Hamming distance between two descriptors is within a threshold value, a server may be configured to interpret the two 3D models associated with the two descriptors as being the same building. If multiple descriptors (e.g., representing multiple different 3D models) are associated with the same Hamming distance with respect to the descriptor associated with a remodeled building, then each of the multiple 3D models may be presented to a user on a display of a user device. Each of the multiple 3D models may be presented as candidates of the building before the remodel, and the user may select the correct 3D model for the building before the remodel.

In some implementations, detecting a structural modification may include executing a deep learning neural network to infer a 3D shape or 3D model of the physical structure with the structural modification from a 2D image. The deep learning neural networks may be trained using supervised or unsupervised learning. The inferred 3D model of the physical structure with the structural modification can be evaluated to generate a descriptor. For example, a descriptor may be a vector that numerically represents structural features of the physical structure with the structural modification. In some embodiments, the descriptor for the inferred 3D model of the physical structure with the structural modification may be used to query a database of pre-existing 3D models to identify the pre-existing 3D model of the physical structure before the structure modification was added, modified, or removed. Querying the database may include comparing the descriptor of the inferred 3D model with the descriptor of each pre-existing 3D model stored in the database. Comparing two descriptors may indicate a structural similarity between the two buildings associated with the two descriptors. As a non-limiting example, comparing two descriptors may include calculating a Hamming distance between the two descriptors. To illustrate, descriptor X representing the structural features of the physical structure with the structural modification may be compared (in a domain space) with descriptor Y representing the structural features of the physical structure before the structural modification. The result of the comparison (e.g., a Hamming distance) indicates an extent to which the physical structure with the structural modification is similar to the physical structure before the structural modification. Further, the result of the comparison may be used to identify the pre-existing 3D model that represents the physical structure before the structural modifications from the various pre-existing 3D models stored in the database.

Certain aspects and features of the present disclosure relate to automatically modifying the identified pre-existing 3D model that represents the physical structure before the structural modification was added. The identified pre-existing 3D model may be modified to reflect the structural modification made to the physical structure. After the pre-existing 3D model of the physical structure without the structural modification is identified using the descriptors, that pre-existing 3D model may be compared with the inferred 3D model of the physical structure with the structural modification to determine the differences. The determined differences represent the structural modification that was added, modified, or removed from the physical structure. In some embodiments, comparing the pre-existing 3D model with the inferred 3D model to identify the differences may include calculating overlapping metrics between the two 3D models. Non-limiting examples of overlapping metrics may include a Dice similarity coefficient, distances errors, a Hausdorff distance, and other suitable metrics. In some embodiments, comparing the pre-existing 3D model with the inferred 3D model may include aligning the two 3D models and executing a 3D-to-3D registration to determine a point-to-point correspondence. The point-to-point correspondence between the two 3D models may indicate regions of the pre-existing 3D model that are different from the inferred 3D model. The identified differences between the pre-existing 3D model and the inferred 3D model may be mapped and used to update the pre-existing 3D model.

In some embodiments, each pre-existing 3D model may also be associated with a 2D image of the corresponding physical structure. In these embodiments, machine-learning models (e.g., deep learning neural networks) may be trained to automatically detect new structural modifications made to a physical structure from a 2D image of the physical structure. In some embodiments, a machine-learning learning model may be trained using unsupervised learning techniques. As a non-limiting example, a convolutional auto-encoder neural network may be trained to detect salient features from a training data set of real images, synthetic images, or 3D models of physical structures. The trained convolutional auto-encoder neural network may include two models: an encoder model that condenses a set of features of an input image (or an input image patch) into a subset of the set of features, and a decoder model that reconstructs the input image (or the input image patch) from the condensed subset of features. After training, the condensed subset of features, which is the output of a hidden layer of the encoder model (e.g., represented in a latent space), may represent the most salient features of the input image (or the input image patch). The condensed subset of features of the originally-captured 2D image (e.g., the original input image) can be used for image matching against the pre-existing 2D images of various physical structures stored in the database.

In some embodiments, a machine-learning model may be trained using supervised learning techniques. As a non-limiting example, a convolutional neural network may be trained to classify images from a training data set of real images, synthetic images, or 3D models of physical structures. Each image of the training data set may be labeled with the keypoints corresponding to structural features of a physical structure. Various images depicting different angles of the same physical structure may be labeled with keypoints representing structural features. To perform image matching, the originally-captured 2D image of the physical structure with new structural modifications may be inputted into a first convolutional neural network and a pre-existing 2D image of a known physical structure may be inputted into a second convolutional neural network. The first and second convolutional neural networks may share weights configured to minimize a loss function.

When a matching pre-existing 2D image has been detected, the pre-existing 3D model that corresponds to the pre-existing 2D image can be identified. One or more 2D-to-3D image registration techniques may be performed to map features (e.g., keypoints) of the captured 2D image to the pre-existing 3D model. As described above, differences between the inferred 3D model and the pre-existing 3D model of the physical structure may be identified and used to update the pre-existing 3D model to reflect the structural modification made to the physical structure.

In various embodiments, a system provides for a platform for storing, accessing, displaying, manipulating, updating and editing various 3D model elements. 3D model elements, include, but are not limited to, 3D building models, with or without textures, and/or facade-mapped surfaces (e.g., sides, roof, interior walls/surfaces, etc.). The 3D building model is representative of a physical building in the real world. In some embodiments, a model generation system is provided that selects a 3D building model corresponding to a physical building in the real world based on one or more uploaded images. An uploaded image is, for example, a photograph of a physical building. In other embodiments, the uploaded image includes a facade of the physical building. In alternative embodiments, the uploaded image is mapped as a facade of the building model.

Performing the region-by-region mapping before the pixel-by-pixel mapping has the advantage of ensuring a "global match" for regional features of the building objects, and removing false negatives that would result from a pixel-to-pixel only approach to building façade matching and registration. For example, if an owner of a building has performed some remodeling to the physical building, any new photographs of the new building are mapped to the building model, due to the regional similarities between the façade residing in the image and the façade(s) associated with the 3D building object, with the remodeled region(s) highlighted as a changed region. In some embodiments, regional similarities between inputs such as a 2D image, an inferred 3D model of the remodeled building, or the pre-existing 3D model of the building before the remodel may be determined by calculating a Hamming distance between descriptors. Descriptors may be generated for an entire structure, or portions thereof. For example, a descriptor may be generated to represent a remodeled house with a new garage (where one did not exist before). The descriptor may distill structural features of the target physical structure into a vector, according to embodiments described herein. In some implementations, the vector may be constrained to include binary values (e.g., "1" or "0") or a string of binary values. The descriptor representing the house with the new garage can be compared with the descriptor of each pre-existing 3D model by calculating, for example, a Hamming distance between the two descriptors. The Hamming distance, though a mathematical relationship of compared binary values, may represent a degree of structural similarity between the target physical structure and another physical structure as they are represented by their respective binary strings. For example, a Hamming distance of "10" between the descriptor of the remodeled house with the garage and another descriptor of another house may indicate that the remodeled house and the other house are different. However, a Hamming distance of "0" may indicate that the remodeled house and the other house are the exact same (e.g., no structural differences). A server may also interpret a Hamming distance of greater than "0" as indicating that the two associated 3D models refer to the same physical structure. For example, if the Hamming distance is "1," which indicates that there is at least some difference between the binary data strings representing the structural aspects of two 3D models being compared, the server may nonetheless interpret the two 3D models being compared as referring to the same house. The structural difference (that resulted in the Hamming distance of "1") may be due to non-structural differences, such as noise in the images, intrinsic differences of cameras that captured images resulting in the models, and the like.

The present disclosure is not limited to using a Hamming distance to determine similarity between two descriptors. Other techniques, as described herein, may also be used. A server may perform any comparison between two descriptors to determine a similarity between the two descriptors. For example, the descriptors may not include binary values, but rather, a descriptor may be a feature vector representing the structural features of the associated 3D model. The feature vectors may be generated using a feature extraction technique. The descriptors (e.g., feature vectors) can be compared in a domain space, such as a Euclidean space or a cosine space. If the distance between two descriptors, which are each represented by a vector, is within a threshold, then server 120 may determine that the two 3D models are similar.

The 2D image of the remodeled building may be inputted into a trained neural network (e.g., a semantic segmentation model) to infer which pixels of the 2D image relate to the remodeled building. The trained neural network may generate a mask to isolate the pixels relating to the remodeled building. The pixels representing the remodeled building may be further evaluated using trained neural networks (e.g., a trained MaskRCNN model) that infer the location of structural intersections (e.g., keypoints) and structure lines of the remodeled building. The detected keypoints and structural lines may be inputted into a neural network trained to infer the depth of structural lines in 2D images. The inferred depth of the structural lines may be used to generate a new 3D model of the remodeled building. The structural remodeling to the building may be automatically detected by comparing the inferred new 3D model of the remodeled building to the pre-existing 3D model of the building without or before the remodeling. The comparison may indicate the structural differences between the two 3D models.

Once a building model has been selected to correspond to the uploaded image, the uploaded image is rectified to the model and registered (mapped) to the image(s) associated with that 3D model of the building. In some embodiments, points in the uploaded image are matched accurately to 3D points of the building model stored in the database to provide a complete 3D mapping of the uploaded image as a facade of the building in the physical world. In one or more embodiments, the 3D building model is re-textured and refined based on the uploaded image. In some embodiments, the system starts with a non-textured 3D building and then applies textures to it as required. The system also offers the user a way to texture the untextured model as desired. For example, a user may select a specific siding (brick, siding, paint, etc.), color, etc.

A 3D model provides some advantages over a two-dimensional (2D) model. For example, a 3D model includes visually accurate representations of buildings. In some embodiments, these representations are used to deliver information to users who view the models. In some embodiments, these representations include a display of the building facade to a viewer of the 3D model. The facade is appended to the 3D model using similar techniques to those used in creating the building representation. Non-limiting examples of a 3D model of a physical structure include a CAD model, a pseudo-voxelized volumetric representation, mesh geometric representation, a graphical representation, a 3D point cloud, or any other suitable 3D model of a virtual or physical structure. The 3D models of physical structures may be generated by a professional or may be automatically generated (e.g., a 3D point cloud may be generated from a 3D camera).

In some embodiments, the user uploads a facade image to the 3D model system. The 3D model system selects the building and the side of the building with which the image corresponds. The 3D model system then identifies a pixel-to-pixel correlation between the building façade in the incoming image and the building façade image(s) associated with the existing 3D model. In alternative embodiments, the 3D model system then submits the image to a render module of the 3D model system. The system then assimilates the collected image into the model and displays the correct portion(s) of the uploaded image as the façade(s) of the building(s). The uploaded 2D image of the remodeled building may be compared against the existing 2D of the building before the remodel. The database may store a pre-existing 3D model and a 2D image for each physical structure associated with the database. In some embodiments, the pre-existing 3D model of the building before the remodel may be identified by comparing the 2D image of the remodeled building with the 2D image of the building before the remodel. To illustrate and only as a non-limiting example, a 2D image of a house with a new garage (e.g., a new structural modification) is captured using a digital camera. The 2D image is inputted into a trained machine-learning model (e.g., a neural network) that has been trained to detect keypoints within the 2D image. A keypoint is a group of pixels with certain characteristics that correspond to a structural feature of the house. The keypoints of the captured 2D image are matched with keypoints of pre-existing 2D images of the known houses stored in the database. The keypoints between the captured 2D image and the pre-existing 2D images of known houses can be matched using image matching techniques, such as scale invariant feature transformation (SIFT) or speed up robust feature (SURF) techniques. A degree to which the keypoints match between the captured 2D image and a pre-existing 2D image of a known house can be assessed to identify a known house that is the closest match to the house within the captured 2D image. The keypoints of the captured 2D image of the house that differ from the keypoints of the pre-existing 2D image of a known house indicate structural features of the house that were modified.

In some embodiments, a system is provided including a database that ingests data from disparate image sources, with a variety of image metadata types and qualities, and manages images geospatially through the creation and continued refinement of camera solutions for each data object. The camera solutions are calculated and refined by the database on the fly, through a combination of the application of image metadata toward image processing methods and the use of optical-only computer vision techniques. The database continually generates data quality metrics, which drive future collection analytics and tasking, as well as quality control requirements.

The techniques introduced here can be applied to any one of a number of types of 3D models that provide accurate representations of building objects. In some embodiments, the 3D model are created from data extracted from one 2D orthogonal image, two or more 2D oblique images, ground level images, aerial images, satellite, a digital elevation model or a combination thereof. Commonly assigned, U.S. Pat. No. 8,422,825, incorporated herein by reference in its entirety, provides additional example systems and methods of creating 3D maps/models.

FIG. 1 illustrates one embodiment of a system architecture of a three-dimensional model system 100. In some embodiments, 3D model system 100 includes an image processing system 102 and a model generation system 104. The model generation system 104 and the image processing system 102 are coupled via network channel 106. Image processing system 102 includes a computer system for processing images in preparation for mapping the images to a 3D environment, for example, using the computer systems of FIGS. 2 and 7-8. Model generation system 104 is a computer system for providing a 3D environment through construction of 3D building models (with or without texturing).

Network channel 106 is a system for communication. The network channel 106 includes any suitable network for any suitable communication interface. In some embodiments, the network channel 106 encompasses a variety of mediums for communication, such as via wired communication for one part and via wireless communication for another part. Network channel 106 includes, for example, an Ethernet or other wire-based network or a wireless NIC (WNIC) or wireless adapter for communicating with a wireless network, such as a WI-FI network. As an example and not by way of limitation, the network channel 106 can include an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the network channel 106 can be a wireless PAN (WPAN) e.g., a BLUETOOTH WPAN), a WI-FI network, a WI-MAX network or a cellular telephone network (e.g., a Global System for Mobile Communications (GSM) network).

In some embodiments, the network channel 106 uses standard communications technologies and/or protocols. Thus, the network channel 106 can include links using technologies such as Ethernet, 802.11, worldwide interoperability for microwave access (WiMAX), 3G, 4G, 5G, CDMA, digital subscriber line (DSL), etc. Similarly, the networking protocols used on the network channel 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). In some embodiments, the data exchanged over the network channel 106 is represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

In some embodiments, image processing system 102 collects images uploaded from capture devices 108. Capture devices 108 are defined as electronic devices for capturing images. For example, capture devices 108 include a camera, a phone, a smartphone, a tablet, a video camera, a security camera, a closed-circuit television camera, a computer, a laptop, a webcam, a pair of electronic glasses, photosensitive sensors, an airplane mounted camera, vehicle mounted camera, drone, satellite or any combination thereof. In some embodiments, capture device 108 images are directly uploaded to image processing system 102 via the network channel 106, or indirectly uploaded to a computer or a server first, before being uploaded to image processing system 102. In another example, the images are transferred from a camera to a networked computer and then transferred to image process system 102.

In another embodiment, the image process system 102 processes the images collected and maps them to a specific building. In yet another embodiment, the image is also mapped to a particular surface or region of the building. The mapping is updated to a façade/model database in model generation system 104. Model generation system 104, according to the mapping stored on the facade database, renders a 3D environment 110 for display on a viewer device 112 (or is returned for display on one or more capture devices 108). The 3D environment 110 is defined as a 3D model including virtual representation of physical world buildings. In another embodiment, the 3D environment 110 also includes 3D models of landscape, terrain or other objects adjacent to a building or location.

Viewer device 112 is defined as a display device. For example, the viewer device 112 can be a computer with a monitor, a laptop, a touch screen display, a LED array, a LCD display, a television set, a projector display, a heads-up display, a phone, a smartphone, a tablet computer, a pair of electronic glasses or any combination thereof. In some embodiments, the viewer device 112 is part of a computer system, such as computer system 800 of FIGS. 2 and 7-8, for processing the 3D environment 110 for display.

Figure 2:
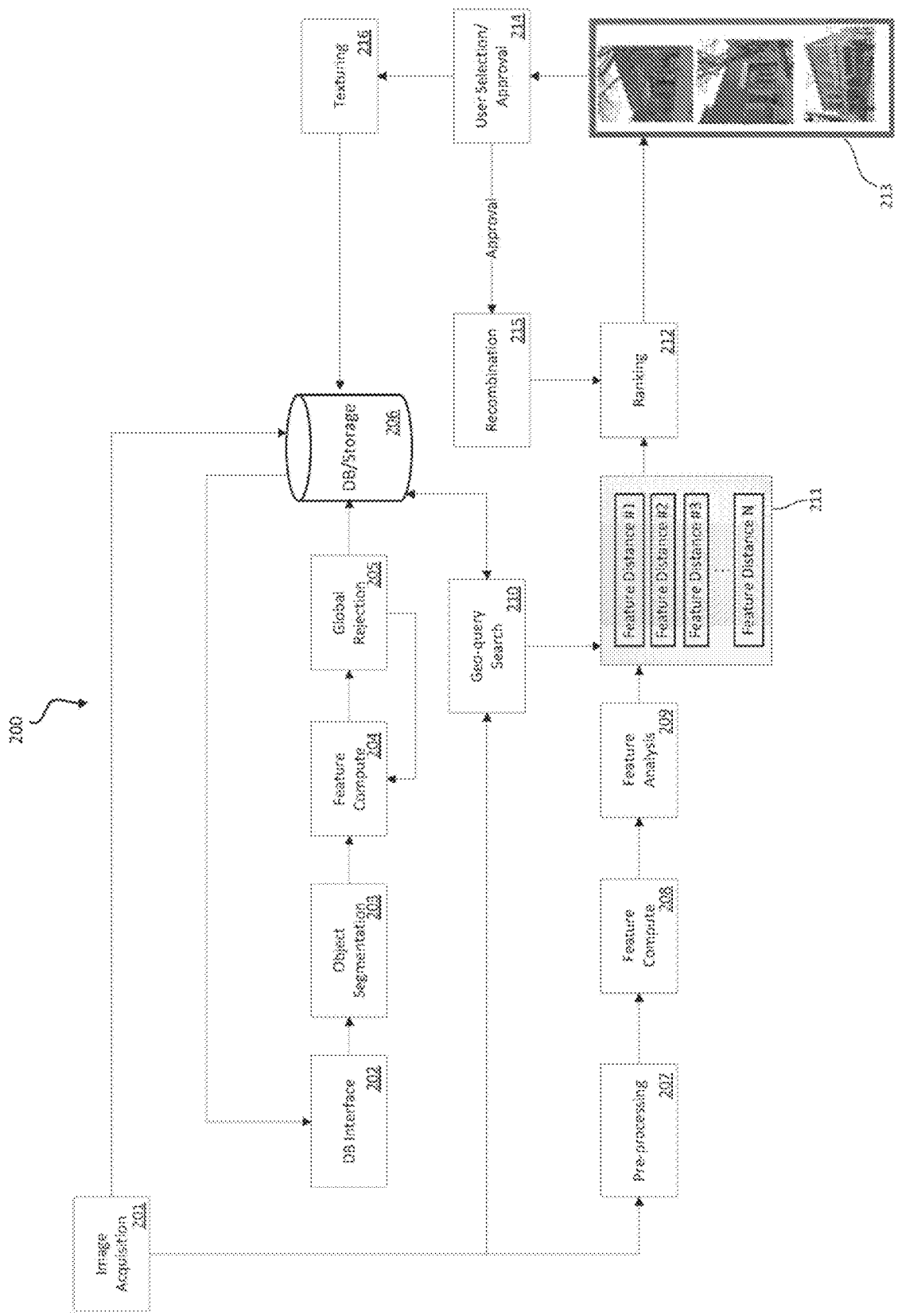
FIG. 2 illustrates one embodiment of a control flow of a computer vision database platform.

FIG. 2 illustrates one embodiment of a control flow of a computer vision database platform. In some embodiments, computer vision database platform 200 is part of the 3D model system 100 of FIG. 1. Computer vision database platform 200, in some embodiments, maps a consumer uploaded image to a particular surface of a building model associated with a physical building. Computer vision database platform 200 is a computer system with at least one processor and one non-transitory memory. In certain embodiments, one or more parts of computer vision database platform 200 are included in image process system 102 and/or model generation system 104 of FIG. 1. In alternative embodiments, the computer vision database platform 200 is a computer system of FIGS. 7-8.

In some embodiments, computer vision database platform 200 includes one or more methods of mapping a consumer uploaded image of a building to a pre-existing stored image of the building or to pre-existing stored 3D models of the building. The one or more methods are implemented by components, storages, and modules described below. In certain embodiments, the modules are implemented as hardware modules/components, software modules, or any combination thereof. For example, the modules described can be software modules implemented as instructions stored in a non-transitory memory capable of being executed by a processor or a controller on a machine described in FIGS. 7-8.

The storages or "stores" described below are hardware components or portions of hardware components for storing digital data. Each of the stores can be a single physical entity or distributed through multiple physical devices. Each of the stores can be distributed through multiple physical devices both locally as well as remotely (e.g., server farms, cloud based servers, etc.). Each of the stores can be on separate physical device or share the same physical device or devices. Each of the stores can allocate specific storage spaces for run-time applications.

In some embodiments, computer vision database platform 200 is provided for computing and managing content based image retrieval for generating 3D building models. In another embodiment, the computer vision database platform provides for a database that is queried by various computer vision, image processing, and other computer algorithms. For example, the database ingests data from disparate image sources, with a variety of metadata types and qualities, and manages images geospatially through the creation and continued refinement of camera solutions for each data object included. In addition, computer vision database platform 200 architecture provides for the management and analysis of images using training analysis, query analysis, comparison metrics, and recombination and ranking sub-parts.

Real-time updating of building model facades requires the acquisition of up-to-date imagery. Referring now to FIG. 2, image acquisition module 201 provides for aggregating collected building images. Image acquisition module 201 accepts images and image metadata from many sources, including but not limited to: orthographic and oblique aerial and satellite imagery, terrestrial vehicular-collected imagery and terrestrial mobile user imagery (e.g., crowdsourced) from smartphone cameras, wearable cameras, other digital cameras, web-cams, security footage, drones and other camera systems. When a collected image is captured by a capture device, metadata associated with the image is also collected. The metadata includes, for example, global positioning system (GPS), compass, accelerometer information, physical descriptions, address, directions, known map position or any combination thereof.

In some embodiments, a user interface is provided allowing the user to input additional metadata. For example, not all devices have GPS built-in to the device, so the user provides the GPS details in the user interface to be provided along with the image data to the image acquisition module 201.

Images are processed by the computer vision database platform to determine if the collected image should replace an existing image for a building object. Collected images are provided by image acquisition module 201 to pre-processing module 207 where the image is processed to remove certain obstructions from the image. Obstructions, for example, include mobile objects such as vehicles, pedestrians, posters, or any combination thereof and background features, such as landscaping, skyscrapers, foliage, environmental elements (e.g., rain, fog, smoke), civil infrastructures or any combination thereof. In some embodiments, the removal process is done semi-automatically or automatically. A semi-automatic example includes the image being shown to a viewer or a trained professional with segmentations overlaid on a display. The viewer or trained professional can then select the segmentations that are considered as obstructions for removal.

Pre-processing module 207 is based on a geometric classifier for obstructions of the collected image. For example, the collected image is processed by the classifier to identify two pedestrians, one car, and two trees. After the obstructions are classified by the geometric classifier, pre-processing module 207 further determines whether an obstruction of the type exists by, for example, a support vector machine for the particular type of the obstruction. Other machine learned models can be used for detecting the obstruction, such as heuristics, mixture models, Markov models, or any combination thereof. These models used can also calculate the statistical probability that an obstruction of the type exists. In some embodiments, a statistical threshold is implemented to make a decision of whether the obstruction should be removed.

Collected images are sent from pre-processing module 207 to feature compute module 208. Feature compute module 208 processes the image to identify various elements of the image. Not all collected images are provided with enough metadata to determine elements and features of the image. Computer vision techniques are used to identify elements and features of the collected images. For example, feature compute module 208 identifies doors, windows, siding, bricks, gables, downspouts, gutters and other architectural features of the collected image to collect information that can be used to compare the collected images with existing images. In some embodiments, elements and features of a collected image are identified by comparing them to a repository of known architectural elements and features.

In other embodiments, new architectural features and elements are added to the repository when it is confirmed that they are properly identified. For example, a collected image contains a door that was not previously identified. However, during image processing, the door was identified as a potential element or feature. During review, a reviewer would provide confirmation of the newly identified element or feature and it would be added to the repository of elements and features for future computing. In an alternative embodiment, the door is positively identified using an automatic dimensional analysis.

Feature analysis module 209 uses the features established by feature compute module 208 along with visual cues and camera solutions to determine additional metadata details for the collected image such as location and orientation information. For example, a total count of features established by feature compute module 208 is combined with the features' distribution and viewpoint estimations calculated by camera solutions of feature analysis module 209 aid the system in identifying existing images within database 206 for comparison and ranking.

In some embodiments, camera solutions provide for camera orientation information of the collected images. For example, crowdsourced façade images collected from various sources are often provided with inaccurate location and/or directional information. The camera solutions within feature analysis module 209 provide estimates for the orientation and location of the collected image using visual cues within the image, gyrometric information (if available), viewpoint estimations (i.e., vanishing point calculations), or other known methods of gathering camera orientation and/or location information. The technology described herein provides for camera solutions that are refined by the system as additional images are processed. The address of the property is less important than the location of structure(s) located in the 3D model relative to each other. This information is made available based on relative image positions and sensor data associated with these images. For example, the system has multiple ways to recognize positions of cameras around a 3D model based on sensor (e.g., augmented reality (AR) sensors) and model data. Augmented reality (AR) is an interactive experience of a real-world environment that uses sensors in mobile devices to accurately detect the real-world environment, such as the locations of walls and points of intersection. This information gives a relative location of structures at that location. For example, if it is known that an in-law unit is to the right of the garage or that the swimming pool is adjacent to the tool shed, etc., than if the tool shed disappeared, the system would know this from an analysis of the 3D model.

In some embodiments, the comparison metric sub-part compares the collected image and metadata information established in the query analysis sub-part to existing images stored in database 206. Comparison metric sub-part includes geo-query search module 210 that compiles sorted list 211 of images based on, in some embodiments, the metadata of the collected image and in some embodiments based on a generated descriptor associated with the collected image. Geo-query search module performs a content based analysis to find the most similar facades in database 206 to the collected image. For example, the location information of the collected image is used to create a boundary box (i.e., location within 1000 ft. radius) that the query search module 210 will use to search database 206 for similar images 213. Sorted list 211 compiles a list of the collected image and similar images collected from the database for comparison. Metadata can include, but is not limited to, mobile device sensor data (e.g., AR sensors), 3D information (JSON), texturing, measurements, architectural features, camera data (i.e., pose, field of view (FOV), position, tilt, angle, distance from plane(s), height, location, etc.), previous updates, etc. This metadata forms a unique signature for an associated building or parts of buildings. When looking to compare imagery or models, the signature or partial signature can be used to identify similar or same structures. The signature or partial signature can also be used to detect changes to a previously built model or previously received imagery. As privacy protections increase for digital services and personal data like geolocation or address information becomes more restricted, non-geographic query techniques are becoming more valuable. Geo-query search module may therefore search using location-agnostic metadata, such as a binary string representing the image's structural features and determine similarity based on descriptor analysis, such as Hamming distance minimization.

In some embodiments, facades of neighboring buildings in the database are ranked according to their similarity in the recombination and ranking sub-part. Ranking module 212 ranks the images based on similarity. In some embodiments, the ranking is based on texture, color, other means of classification based on image property, or any combination thereof (e.g., similarity to one or more portions of a previously recognized signature). A ranked list 211 is provided to the user selection/approval module 214 where the user/system approves the top image or selects an alternative image. In some embodiments, the system approves the top ranked image and the building model is textured accordingly. In alternative embodiments, the user selects an image from the list that is not the top ranked image. The building model is textured in texturing module 216 according to the user's selection. Additionally, the ranked images are revised according to the selection and recombination module 215 adjusts weighting of the features to account for the selection and guide future image ranking. In some embodiments, the adjustment of the weighting is done semi-automatically. For example, the selected image is shown to a reviewer or a trained professional with other similar images on a display and decides how to adjust the weighting based on the selected image.

The training analysis sub-part includes object segmentation module 203 which provides for object segmentation from the images where the image is processed to identify certain features of the image that represent non-façade data. For example, the object segmentation module 203 identifies foliage from the image that causes an obstructed view of the building façade. Other obstructions include mobile objects such as vehicles, pedestrians, posters, or any combination thereof and background features, such as landscaping, foliage, skyscapes, rain, fog, smoke, civil infrastructures or any combination thereof. In some embodiments, the removal process is done semi-automatically. For example, the image is shown to a viewer or a trained professional with segmentations overlaid on a display. The viewer or trained professional can then select the objects that are considered as obstructions for removal. The training analysis sub-part adapts to new features and quality metrics, which drive future collection analytics and all human quality control requirements.

Following pre-processing, feature compute module 204 processes the image to determine additional information. For example, not all regions of the collected images are identified, or they are incorrectly identified. In some embodiments, feature computer module 204 provides region matching of the image in order to identify the regions of the collected images. Each region in the image can be defined based on heuristics of what a regular feature on a façade looks like.

In some embodiments, computer vision techniques may be executed to generate one or more descriptors for each collected image. For example, a descriptor may be a numerical representation of the structural features of a house. According to embodiments described herein, a result of comparing descriptor X representing the structural features of building X with descriptor Y representing the structural features of building Y may be determined. The result of the comparison indicates an extent to which building X and building Y are structurally similar.

To illustrate and as a non-limiting example, server 120 may generate a descriptor to characterize the structural features depicted in an input image of the top-down view of a physical structure or in an image or representation of the top-down view of a 3D model of the physical structure. In embodiments where the image is a synthetic (e.g., virtual) top-down view of the 3D model of the physical structure, a descriptor may be generated to numerically represent the structure of the 3D model as viewed from the top downward. To generate the descriptor, metadata of the image may be used to normalize the orientation of the image. As a non-limiting example, metadata may include data representing a front outward facing vector of the 3D model of the physical structure. The front outward facing vector of the new 3D model can be used to normalize the orientation of the 3D model. Any vector or metadata of the top-down view of the new 3D model can be used to normalize the orientation of the new 3D model, and thus, the present application is not limited thereto. Additionally, the present disclosure is not limited to generating a descriptor from the top-down view of a structure of 3D model. Other angles or views of the physical structure or 3D model of the physical structure may be used herein. The synthetic image may be divided into N tiles. As a non-limiting example, the tiles may have a size of 16×16 pixels. However, the size of the tiles can be any number of pixels. For each tile of the N tiles, server 120 may determine which subset of structural features is contained in the tile. For example, the existence or absence of a particular structural feature (e.g., a corner of a window) within the pixels of a tile may be represented by a bit (e.g., a binary value). The N bits for the N tiles can be concatenated to generate the final descriptor that numerically represents the structural features depicted within the image.

In embodiments where the input image is a real 2D image (e.g., an image captured by a camera) of the top-down view of a physical structure, server 120 may perform semantic segmentation on the 2D image to identify salient roof structures, such as ridge lines, apexes, presence of roof, and so on. For example, server 120 may evaluate an input image for a set of keypoints (e.g., 14 keypoints). A keypoint may represent a group of pixels that relate to a key structural intersection of a physical structure (e.g., a front apex, which is the intersection of two rake lines of a roof, may be a keypoint. As an output, a synthetic image with certain structural information may be generated. The synthetic image may be akin to a synthetic image generated from the top-down view of the 3D model, described above. Based on the angle of certain lines in the synthetic image (e.g., key lines), server 120 may rotate the image to a normalized orientation. Server 120 may divide the synthetic image into N tiles, as described above. For each tile, server 120 may determine which subset of structural features is contained in the pixels of the tile. For example, the existence or absence of a particular structural feature within the pixels of a tile may be represented by a bit (e.g., a binary value). The N bits for the N tiles can be concatenated to generate the final descriptor that numerically represents the structural features of the physical structure captured in the 2D image.

In embodiments where the input image is a 3D voxelization, server 120 may evaluate metadata of the input image to normalize the orientation of the physical structure represented in the 3D voxelization. For example, the metadata may include a 2D projection of a ridgeline of a roof onto the ground plane. Server 120 may then use the 2D projection of the ridgeline to rotate the new 3D model to a normalized orientation (e.g., 0 degrees, 90 degrees, or any orientation). For each voxel of the 3D voxelization, server 120 may determine which subset of structure features are detected within the voxel. For example, the existence or absence of a particular structural feature (e.g., a window or a portion of a window) within the voxel may be represented by a bit (e.g., a binary value). The N bits for the N voxels of the 3D voxelization can be concatenated to generate the final descriptor that represents the image.

In other embodiments, uniqueness of color within a 2D RGB (red, green, blue) image may be evaluated to generate a descriptor for a region of the 2D RGB image. Other image characteristics that can be used as a basis to generate a descriptor may include shapes, motion, and texture. The identified descriptors are utilized to correlate similar images. For example, database 206 includes a repository of stored images that have already been processed and associated with a 3D building model. In some embodiments, descriptors from the collected images are used to correlate the collected image with stored images based on statistical probability that the images are the same. If a correlation exists, related metadata from the stored image is shared with the collected image. The new metadata associated with the collected image is sent to global rejection module 205 where non-façade data determined by object segmentation are removed before stored in database 206. In another example, the system performs object detection in association with the camera and imagery capture. The system locates objects in 3D world co-ordinates within the 3D model. If these objects change position, the system is able to detect these changes in real time. For example, if a window was replaced by a door.

Each region of the correlated stored image is matched against each region in the collected image. In some embodiments, the region matching can occur such that even if the camera conditions (e.g., angle, distance, focus, etc.) of the collected image are different from the stored image, the collected image is stretched in such a way that regions of the collected image are still mapped. Matched regions are annotated as being mapped to each other and saved and reflected database 206.

The computer vision database platform 200 can include one or more methods of mapping an image. The one or more methods can be implemented by components, storages, and modules described throughout the specification. The modules can be implemented as hardware modules/components, software modules, or any combination thereof. For example, the modules described can be software modules implemented as instructions on a non-transitory memory capable of being executed by a processor or a controller on a machine described in FIGS. 7-8.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module.

Figure 3:
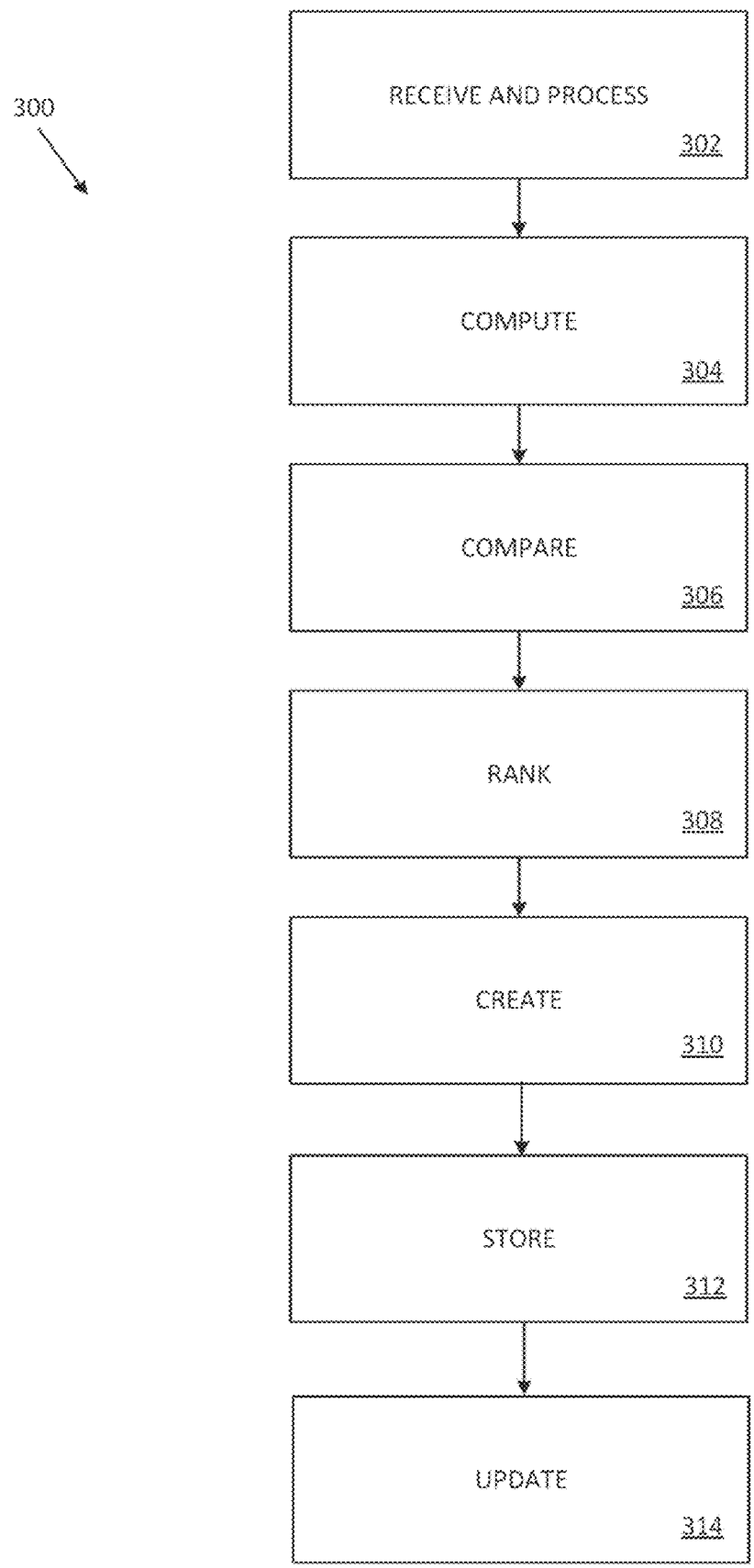
FIG. 3 illustrates one embodiment of a flow chart of a method of real-time updating of 3D building models.

FIG. 3 illustrates one embodiment of a flow chart of a method of real-time updating of 3D building models. In some embodiments, method 300 is part of the 3D model system 100 of FIG. 1. The method includes receiving and processing collected images in step 302. Collected images are analyzed to remove obstructions, and features are computed in step optional 304. Using the computed information along with camera solutions and computer vision techniques, feature analysis step 306 provides additional metadata for the collected images. Images stored in the database are retrieved based on query information of the collected image for comparison and ranking. For example, location information and computed features are used to query the database and retrieve similar images. Metadata can include, but is not limited to, mobile device sensor data (e.g., AR sensors), 3D information (JSON), texturing, measurements, architectural features, camera data (i.e., pose, field of view (FOV), position, tilt, angle, distance from plane(s), height, location, etc.), previous updates, etc. This metadata forms a unique signature for an associated structure or parts of a structure (e.g., building exterior or interior of buildings). When looking to compare imagery or models, the signature or partial signature can be used to identify similar or same structures. The signature or partial signature can also be used to detect changes to a previously built model or previously received imagery.

Using the geospatial data and camera solutions described above, the pixels of the collected image now registered in 3D space are correlated to the pixels of the retrieved stored images. New pixels generated by the collected image are registered into the 3D framework for maintaining a real-time representation of the 3D textures of a 3D building model.

The collected images and the stored images from the database are ranked in step 308. The ranked images are presented to the user/system for validation and confirmation. In some embodiments, the user/system is required to either approve the top ranked image or selected an alternative image. In step 310, a pixel-to-pixel correlation between the collected image and the selected image is created by iteratively aligning the pixels from the collected image to the pixels for the selected image. The selected image is stored into the database in step 312 along with all of the metadata associated and learned during processing. In step 314, the system updates 3D textures of the 3D building model with a new façade if the selected image was different from the current building image. If the selected image was not the collected image, the collected image is stored in the database along with the associated metadata.

If the selected image is not the top ranked image the ranking, recombination algorithms are adjusted to account for the selection criteria. In one system training embodiment, a user/system selects an image that is not the top ranked image; the user/system provides selection criteria along with the selection to indicate the reasons the selected image was chosen over the top ranked image. Selection criteria input includes, for example, orientation, obstruction, lighting, image quality, feature information of the selected image or any combination thereof. The computer vision database platform interprets the input and adjusts weightings accordingly for future automated image collection and ranking.

Figure 4:
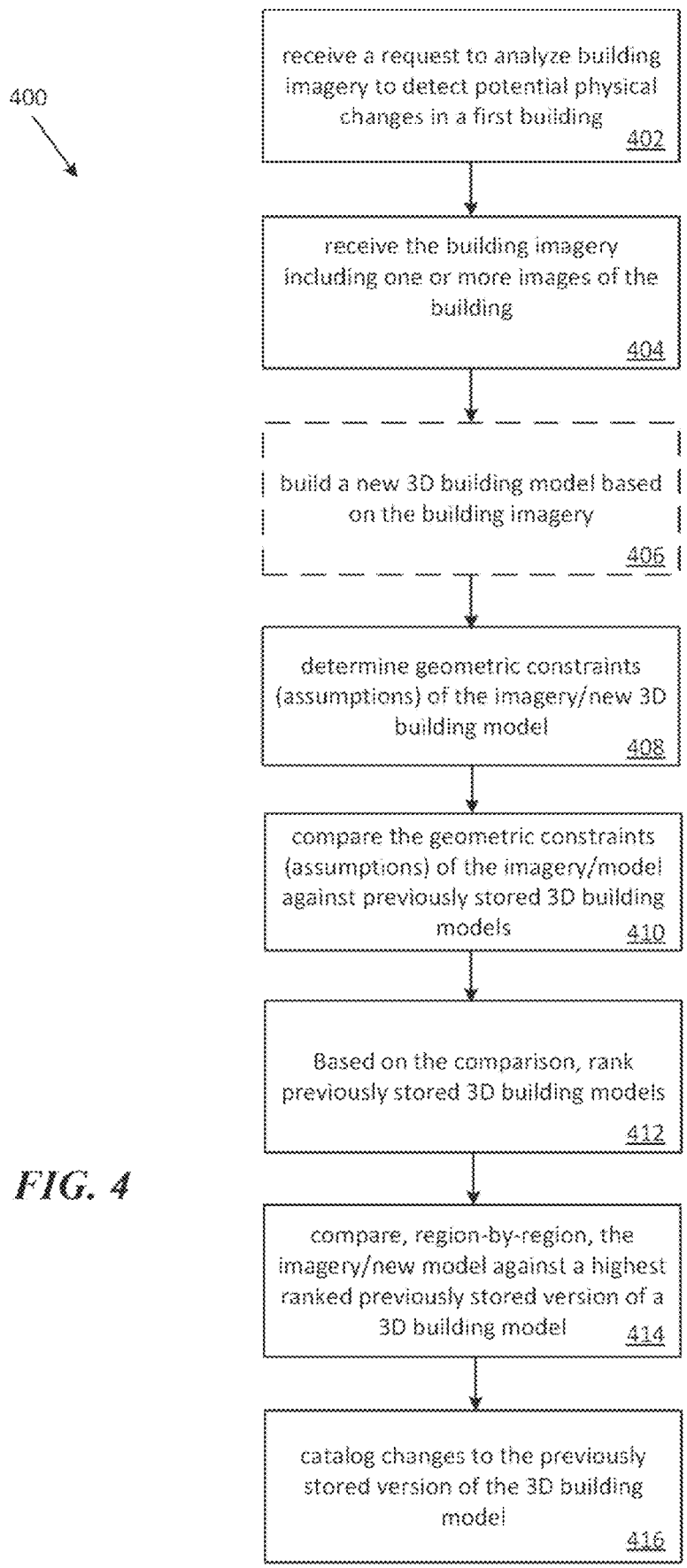
FIG. 4 illustrates another embodiment of a flow chart of a method of real-time updating of 3D building models.

FIG. 4 illustrates a flow chart for improving quality of a training set used in identifying similar buildings. Training sets teach the system how to optimally recognize features within building imagery by recognizing which criterium produce the most accurate evaluations. For example, if we have a first image to compare against a training set of images, the training set determines which features, or combination of features, will allow the system to recognize the images as belonging, for example, to a same building.

When imagery is received, it is checked (compared) against an existing database of imagery (or 3D building models) to locate similar imagery (e.g., identify a same façade from a previous image of that façade or an instantiation of the building in a previously stored 3D building model). Alternately, the training system improves recognition of architectural features or sets of features in building imagery.

As described previously in FIGS. 2-3, analyzing collected images to remove obstructions and compute features (step 304, described previously), requires extensive computing power to compare pixels of imagery against previously stored images or 3D model facades. For example, to compare architectural feature sets against a million building images would waste extensive computing resources and time. The methods, as described in the FIG. 3 embodiment, assist in reducing an intensive step of pixel-to-pixel comparisons by creating a multi-step process to reduce the set for comparison to a smaller set with similar metadata of architectural features. Metadata can include, but is not limited to, mobile device sensor data (e.g., AR sensors), 3D information (JSON), texturing, measurements, architectural features, camera data (i.e., pose, field of view (FOV), position, tilt, angle, distance from plane(s), height, location, etc.), previous updates, etc. This metadata forms a unique signature for an associated building or parts of buildings. When looking to compare imagery or models, the signature or partial signature can be used to identify similar or same structures. The signature or partial signature can also be used to detect changes to a previously built model or previously received imagery.

The smaller set is ranked and only the higher (highest) ranked imagery is compared in the intensive computing step of pixel-to-pixel comparison. However, the first step of architectural metadata comparisons still remains complex and computationally intensive.

Machine learning techniques such as AI (artificial intelligence), deep learning systems or neural networks can recognize patterns, feature sets and complex previously unseen or unknown relationships in imagery. In one example embodiment, a training set of building images (e.g., 10,000 images) is processed through a neural network system to identify a limited set of geometric constraints (geometric assumptions) that enable a quick recognition of similar buildings or a quick recognition of dissimilar buildings. This limited set of geometric constraints would represent an optimal subset (combination) from a larger set of all possible architectural features identified in building images.

In a first example, recognition of gable structures in a specific orientation relative to a centerline of a house could be used to quickly eliminate dissimilar images (or include similar building images). For example, a building with gables on both ends (where center axis of building is parallel to front façade) can be quickly distinguished from a building with gables only in the front and back and a center axis perpendicular to the front facade. In another example, keypoints (geometrical points and lines that compose the geometric constraint, like apex points, eaves, rake lines, etc.) are used to source similar training images.

In a second example, the neural network system may determine that a combination of gables and garage doors provides a quick filtering of a large set of building images. For example, an image of a front of a building with two gables and two garage doors can quickly distinguish over an image with one gable and one door, no gables, two gables and three garage doors, etc.

In a third example, a total number of doors and windows may quickly remove dissimilar building images. For example, a building image with a total of 10 doors and windows (eight doors and two windows) may quickly be determined to be dissimilar to building images with 40 total windows and doors. However, in this example, a variance in the total (e.g., within 10 of the total count) may be needed as windows or doors may be added/removed in a remodel or addition.

In a fourth example, a dimensional analysis (e.g., the overall dimensions (or total dimensions) of the façade or the footprint of the building may quickly identify or remove similar/dissimilar building images. A building with a 30-foot front façade would be quickly distinguished from buildings with 60-foot façades.

In each of the above examples, an optimal subset (limited list) of geometric constraints (assumptions) is recognized and used to quickly reduce (filter) a larger set of images into a smaller set. However, the instant technological descriptions can equally be applied to comparing imagery to previously instantiated 3D building models or comparing previously instantiated 3D building models to new 3D building models without departing from the scope described herein. In addition, the specific optimal geometric constraints provided above are for example purposes only and can be substituted using any recognized geometric consideration or architectural element or combination of elements without departing from the scope described herein.

In some embodiments, the system uses a ranked listing of optimal geometric constraints (assumptions) to select from based on an initial analysis of the imagery. For example, gables may be an optimal geometric constraint for images of buildings located in New England where roofs are steep to prevent snow accumulation and roof failures, but not useful in Florida where many buildings have flat roofs. Therefore, an optimal set is different in these two building image scenarios. In various embodiments, the optimal set can be chosen based on a specific selectable criterion (e.g., location).

In an alternative embodiment, the training set is tiered, with a first optimal geometric constraint most likely to reduce the set to similar images applied first, followed by lower tier optimal geometric constraints applied alternatively or in addition to the first optimal geometric constraints. For example, to analyze a first building image that has geometric constraints of two gables and a garage door, first remove all images that fail to have two gables and then remove all remaining images that fail to have garage doors.

Using architectural features, the model building module can recognize traditional architectural feature sets as described previously in association with FIG. 3. However, using the FIG. 4 embodiment, the model building module can first quickly reduce a large set (e.g., a million building images) into a smaller subset based on inclusion of a desired optimal subset features (geometric constraints).

When receiving imagery to build a 3D building model, the building modeling module assigns metadata that reflects recognized optimal geometric constraints found within the imagery. When instantiating a 3D building model, the 3D building model is also assigned metadata that reflects recognized optimal geometric constraints found within the model for quick comparison against future building imagery or other 3D building models.

FIG. 4 illustrates one example embodiment of recognizing a building from a set of building images (or models) based on geometric assumptions or descriptors either generated or attached as metadata to the images (models). In step 402, the system receives a request to analyze building imagery to detect potential physical changes in or around a building. In step 404, the system receives the building imagery, the building imagery including one or more images of the building. In step 406, the system "optionally" builds a 3D building model based on the building imagery as per any of FIGS. 1, 2, 7, or other known model building systems.

In step 408, the system determines, based on metadata, geometric constraints (assumptions) of received imagery or a newly built 3D building model. The geometric constraints may, in some embodiments, be based on a limited number of the geometric constraints as determined by a training set of a neural network. For example, the geometric constraints may be determined based on one or more architectural features (or combination thereof).

It step 410, the system determines if the received imagery/newly built 3D building model includes at least the geometric constraints of previously stored 3D building models and, when the received imagery/newly built 3D building model includes at least the geometric constraints of the first 3D building model and, in step 412, ranks the previously stored 3D building models. In some embodiments, the ranking is based on Hamming distance minimization between binary string descriptors that represent the structure of the respective imagery and model.

In step 414, the system compares, planes (on a region-by-region or pixel-by-pixel basis) the received imagery/newly built 3D building model against planes of the highest ranked previously stored version of the first 3D building model.

In step 416, the system catalogs, in computer storage, changes to planes of the previously stored version of the first 3D building model. The catalog includes historical lists of changes over time to the first 3D building model. The changes represent physical changes to or around the building.

In some embodiments, the system determines if the changes in one or more of the regions of the first 3D building model reaches a threshold for updating the previously stored version of the first 3D building model. In some embodiments, the system determines regional updating by comparing a descriptor difference between 3D building models. For example, a Hamming distance difference above a threshold prompts update of the one of more region to include complete updating of the entire 3D building model. The threshold can be set by the system or user of the system to be, for example, N or more regions with changes or one region with X or more changes to that region. Changes can be noted by using image recognition techniques, object classifiers, noting changes to specific pixels or groups of pixels, noting changes to specific line segments, surfaces, planes, or architectural features, etc.

In some embodiments, the system highlights the changes on any of a visual instantiation of the new version of the 3D building model or the previously stored 3D building model. The visual instantiation can be local (on a system display) or remotely, for example, on a mobile device display and be static (cannot be changed) or interactive.

In some embodiments, the system compares partial model data (e.g., partial fingerprint) of the first 3D building model against partial model data of a plurality of previously stored 3D building models to detect the previously stored version of the first 3D building model. The partial model data, in some embodiments, includes at least line segments of the 3D building models (excluding textured surfaces).

In some embodiments, the system determines if specific features are present or missing in one or more of the regions of the first 3D building model. The specific features include, but are not limited to, any of decorative features, safety related features, architectural code features, standard features or optional features. For example, safety related features include, but are not limited to, any of smoke alarms, fireplaces, swimming pools, diving boards, or stairs.

In some embodiments, the system scales and dimensions the 3D building model, including one or more architectural features. The scaled and dimensioned 3D building model can be analyzed for any of square footage, living areas, or replacement material costs, etc.

In some embodiments, the system recognizes (identifies) adjacent objects to the building in the 3D building model. Such adjacent objects include, but are not limited to, separate standing structures, sheds, fences, driveways, walkways, landscaping, lighting, playgrounds, swimming pools, etc.

In some embodiments, the system cataloging changes in one or more of the regions of the first 3D building model for input to an insurance processing claims or underwriting program. For example, for insurance purposes, the system determines if the changes in one or more of the regions of the first 3D building model reaches a threshold for physically rebuilding/repairing/remodeling one or more elements of the building and correspondingly, the 3D building model (e.g., based on any rebuilding/repairing/remodeling).

Figure 5:
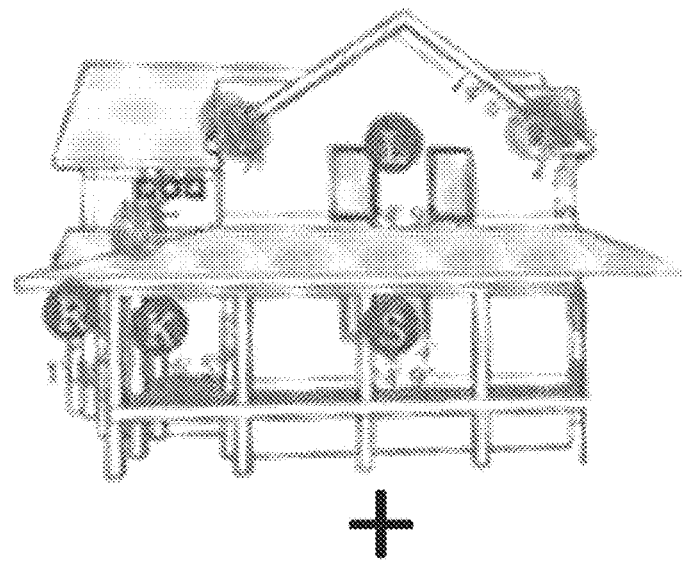
FIG. 5 illustrates another example embodiment of real-time updating of 3D building models.
Figure 5:
Figure 5:
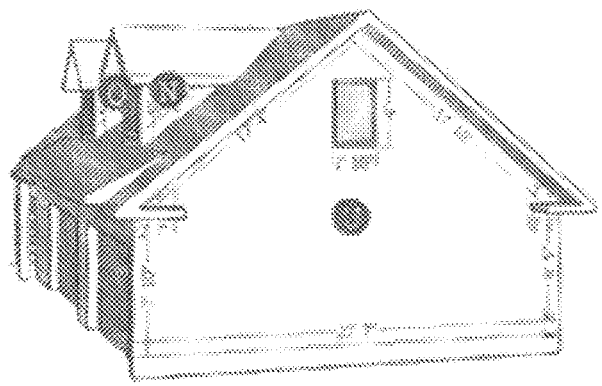
Figure 5:
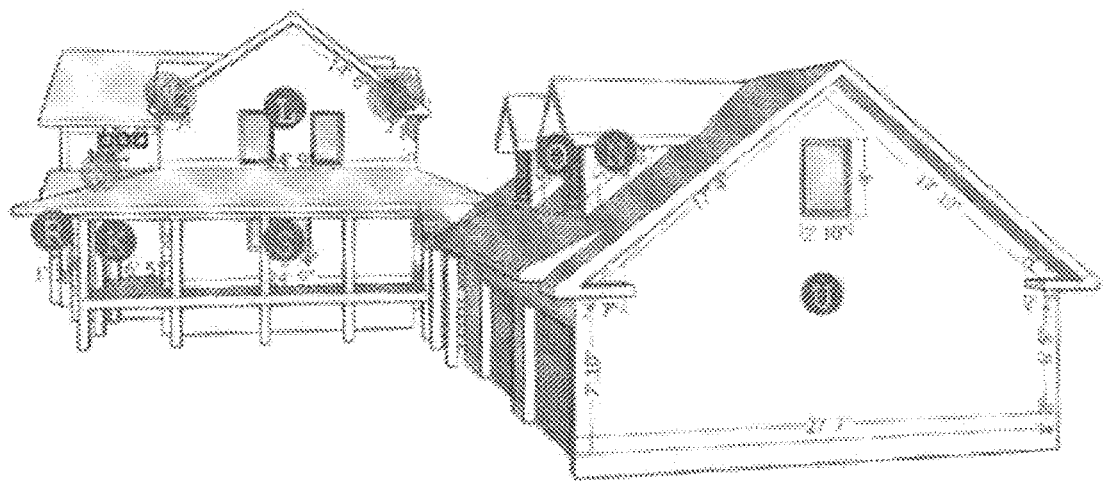

FIG. 5 illustrates an example embodiment of real-time updating of 3D building models. As shown, during a comparison of a 3D model of a building (shown as a house), where the main house is recognized through the FIG. 4 process and then a new structure (shown as a three-car garage) is further detected. This new feature would be cataloged and added to a new version of the previous 3D building model. In addition, the new structure could be identified for processing of insurance or property taxes. While the garage is shown as connected to the house, the system can identify an object (e.g., detached garage, shed, pool, etc.) in or around (near/adjacent/at the same location) the original 3D building model. As long as it is shown in captured imagery at the location of the building, it can be identified (classified) and added to a list of features of the original 3D model and included in a new version of the previous 3D building model.

Figure 6:
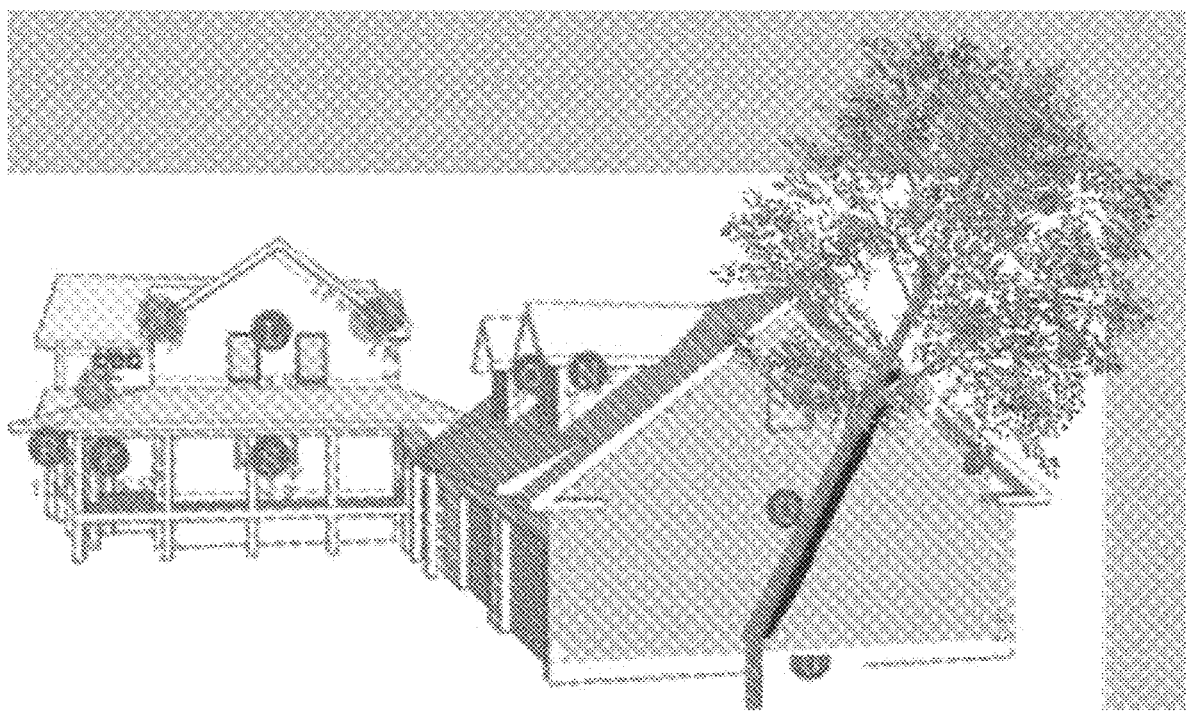
FIG. 6 illustrates yet another example embodiment of real-time updating of 3D building models.

FIG. 6 illustrates another example embodiment of real-time updating of 3D building models. As previously described, the system can catalog changes in one or more of the regions of the first 3D building model for input to an insurance processing claim or underwriting program. For example, for insurance purposes, the system determines if the changes in one or more of the regions of the first 3D building model reaches a threshold for physically rebuilding (remodeling) one or more elements of the building and correspondingly, the 3D building model (e.g., based on any repairs/rebuilding/remodeling). As shown, a tree has come down across one or more regions of the garage (side/façade/ roof) and will be identified and listed when the changes in one or more of the regions of the first 3D building model are determined (e.g., because of damage or a remodel).

Figure 7:
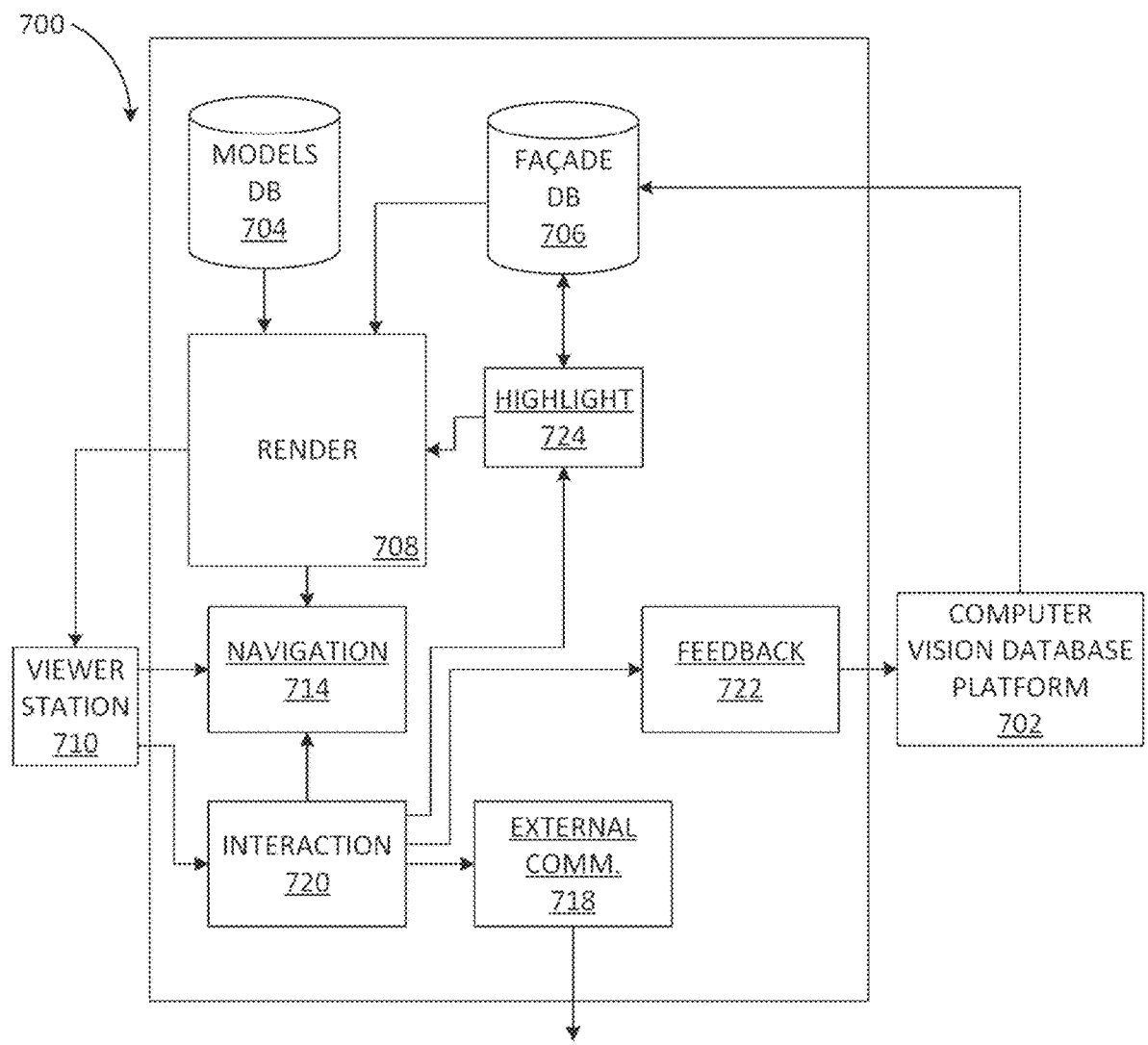
FIG. 7 illustrates one embodiment of a control flow of a model generation system.

FIG. 7 illustrates one embodiment of a control flow of a model generation system. In some embodiments, the model generation system 700 is part of the 3D model generation system 104 of FIG. 1. The model generation system 700 is for generating a 3D model from at least geo-coded facade corresponding to a 3D building model. The model generation system 700 is a computer system with at least one processor and one non-transitory memory. The model generation system 700 can be the model generation system 104 of FIG. 1. In alternative embodiments, the model generation system 700 is also on the same computer system as the image process system 102 of FIG. 1. In another embodiment, the model generation system 700 is the computer system of FIG. 8.

In certain embodiments, the model generation system 700 includes one or more methods of generating a 3D model. The one or more methods are implemented by components, storages, and modules described below. In some embodiments, the modules are implemented as hardware components, software modules, or any combination thereof. For example, the modules described can be software modules implemented as instructions on a non-transitory memory capable of being executed by a processor or a controller on a machine described in FIG. 8.

In some embodiments, each of the modules operates individually and independently of other modules. In certain embodiments, some or all of the modules are combined as one module. A single module can also be divided into sub-modules, each performing separate method step or method steps of the single module. In some embodiments, the modules share access to a memory space. In alternative embodiments, one module accesses data accessed by or transformed by another module. The modules can be considered "coupled" to one another if they share a physical connection or a virtual connection, directly or indirectly, allowing data accessed or modified from one module to be accessed in another module.

The storages or "stores" described below are hardware components or portions of hardware components for storing digital data. Each of the storage can be a single physical entity or distributed through multiple physical devices. In some embodiments, each of the storage is on separate physical device or share the same physical device or devices. Each of the stores, for example, allocates specific storage spaces for run-time applications.

The model generation system 700 can include additional, fewer, or different modules for various applications. Conventional components such as network interfaces, security functions, load balancers, failover servers, management and network operations consoles, and the like are not shown so as to not obscure the details of the system.

The model generation system 700 can be coupled to a computer vision database platform 702. Computer vision database platform 702 is a computer system for processing images, such as the image processing system 102 of FIG. 1.

In some embodiments, the model generation system 700 includes a model's database store 704. The model's database store 704 is a store for the model generation system for storing building models for use in the overall 3D model system.

In some embodiments, the model generation system 700 includes a render module 708. The render module 708 is for generating a 3D model environment. For example, the render module 708 can generate the 3D model by rendering building models for displaying on a viewer station 710 (locally on PC or remotely on user device (e.g., smartphone, tablet, etc.)).

In some embodiments, the model generation system 700 includes a navigation module 714. The navigation module 714 is for traversing through the 3D model environment generated by the render module 708. For example, a user operating the viewer station 710 can use arrow keys or mouse to move about the 3D model environment that is rendered in real-time. In certain embodiments, the viewer station 710 displays representations of physical buildings in different perspective as the user navigates from different perspective position and direction between the 3D models. The navigation module 714 facilitates that navigation and coordinates the re-rendering of the building models and the facades.

In some embodiments, the render module 708 includes a widget module 716. Widget module 716 is for providing a widget alongside or on a facade. For example, the widget module can communicate with a social network via an external communication module 718. In other embodiments, the widget module displays a feed of a page on the social network on a facade of a building model, wherein the page is for the tenant of the physical building represented by the building model.

In some embodiments, the model generation system 700 includes an interaction module 720. The interaction module 720 is for processing and recording interactions received from the viewer station 710. For example, the interaction module 720 can serve multiple functions. The interaction module 720 can serve to receive inputs from the viewer station 710 about the direction and position of the 3D models to traverse to. In this example, the interaction module 720 can be coupled to the navigation module 714 to re-render the 3D model for the viewer station 710.

The interaction module 720 can also receive inputs from the viewer station 710 to interaction with an external system, such as a social network system, a communication service, or a point-of-interest website. In one specific example, the interaction module 720 can receive voice or text inputs for a user of the viewer station 710 to communicate through a communication portal provided by the widget module 716.

The interaction module 720 can further receive feedback inputs for the image process system 702. The feedback inputs can be processed by a feedback module 722. The user of the viewer station 710 can comment on or interact with items displayed on facades rendered by the mapping module 712. The user can also comment on or interact with the building models themselves. These comments and interactions can be piped back to the image process system 702 for processing. For example, the user can select a region of a facade to indicate that there is texture mismatch. The image process system 702 can then take that feedback to correct the mapping of the facade. The user can also provide an explanation of the texture mismatch.

In some embodiments, the model generation system 700 includes a highlight module 724. The highlight module 724 is for detecting changes in facades of building models, including specific regions or facades as a whole. In other embodiments, the highlight module 724 also coordinates with the render module 708 to highlight the region of the facade that has changed. As new facades for a building model are uploaded from the image process system 702, the highlight module 724 can analyze the new mapped photos to highlight the regions in those photos that are different from the previous versions of stored facades. In some embodiments, the region match module 220 of FIG. 2 provides the information about which regions of the facade have been changed.

In some embodiments, the highlight module 724 is used in a variety of applications. In certain embodiments, the detected change is used for inspection. This includes inspection of whether a building has been knocked down, a wall has been repainted. In some embodiments, the detected change is used for detecting patterns of change. For example, the highlight module 724 can indicate that the door of this building appears to open every day at 7 AM by recognizing a regional change of the facade image at the door of the building model. In some embodiments, the detected change further is used for user search and contextual information.

Figure 8:
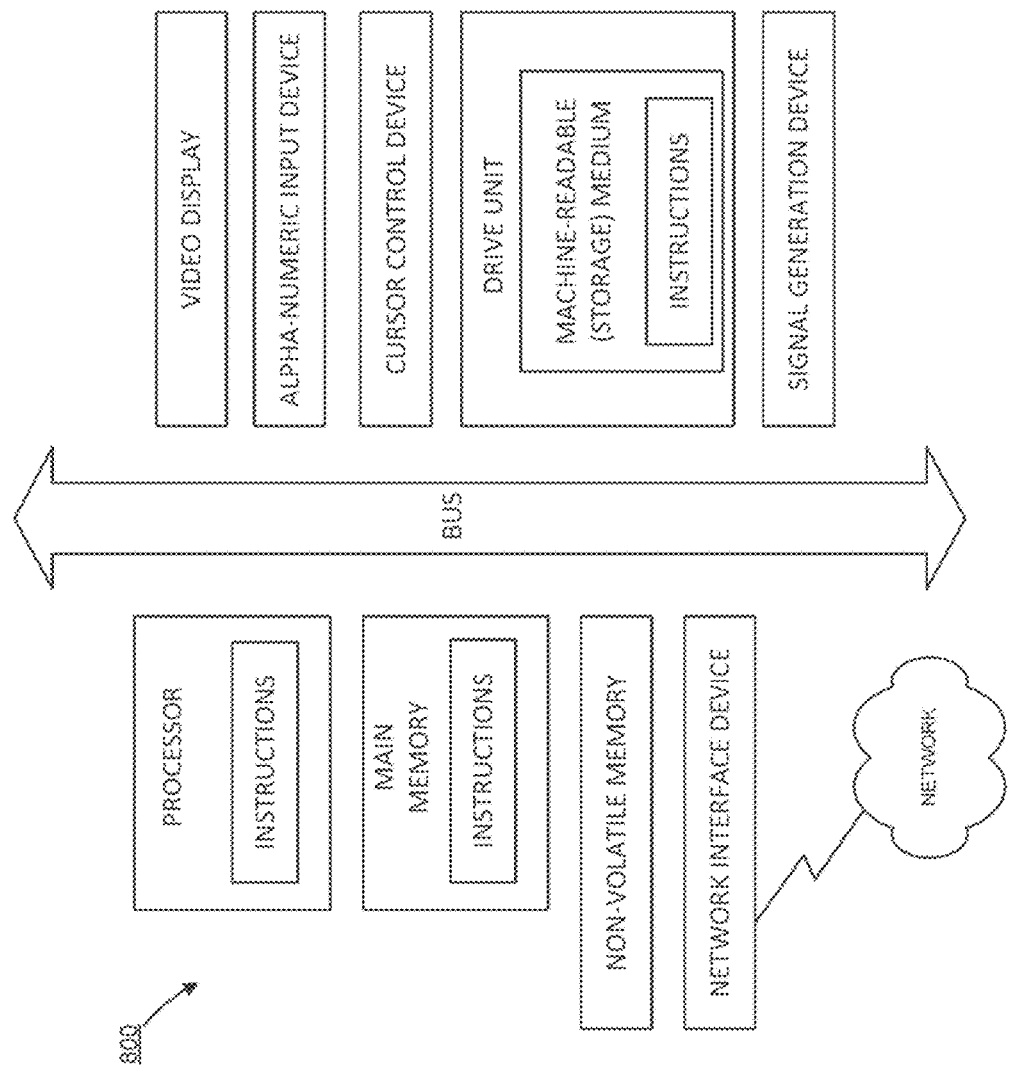
FIG. 8 illustrates one embodiment diagrammatic representation of an example computer system within which a set of instructions, for causing the machine to perform any one or more of the methodologies or modules discussed herein, may be executed

Referring now to FIG. 8, therein is shown a diagrammatic representation+-of a machine in the example form of a computer system 800 within which a set of instructions, for causing the machine to perform any one or more of the methodologies or modules discussed herein, may be executed. Computer system 800 includes a processor, memory, non-volatile memory, and an interface device. Various common components (e.g., cache memory) are omitted for illustrative simplicity. The computer system 800 is intended to illustrate a hardware device on which any of the components depicted in the example of FIGS. 1-2 and 7 (and any other components described in this specification) can be implemented. The computer system 800 can be of any applicable known or convenient type. The components of the computer system 800 can be coupled together via a bus or through some other known or convenient device.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

Figure 9:
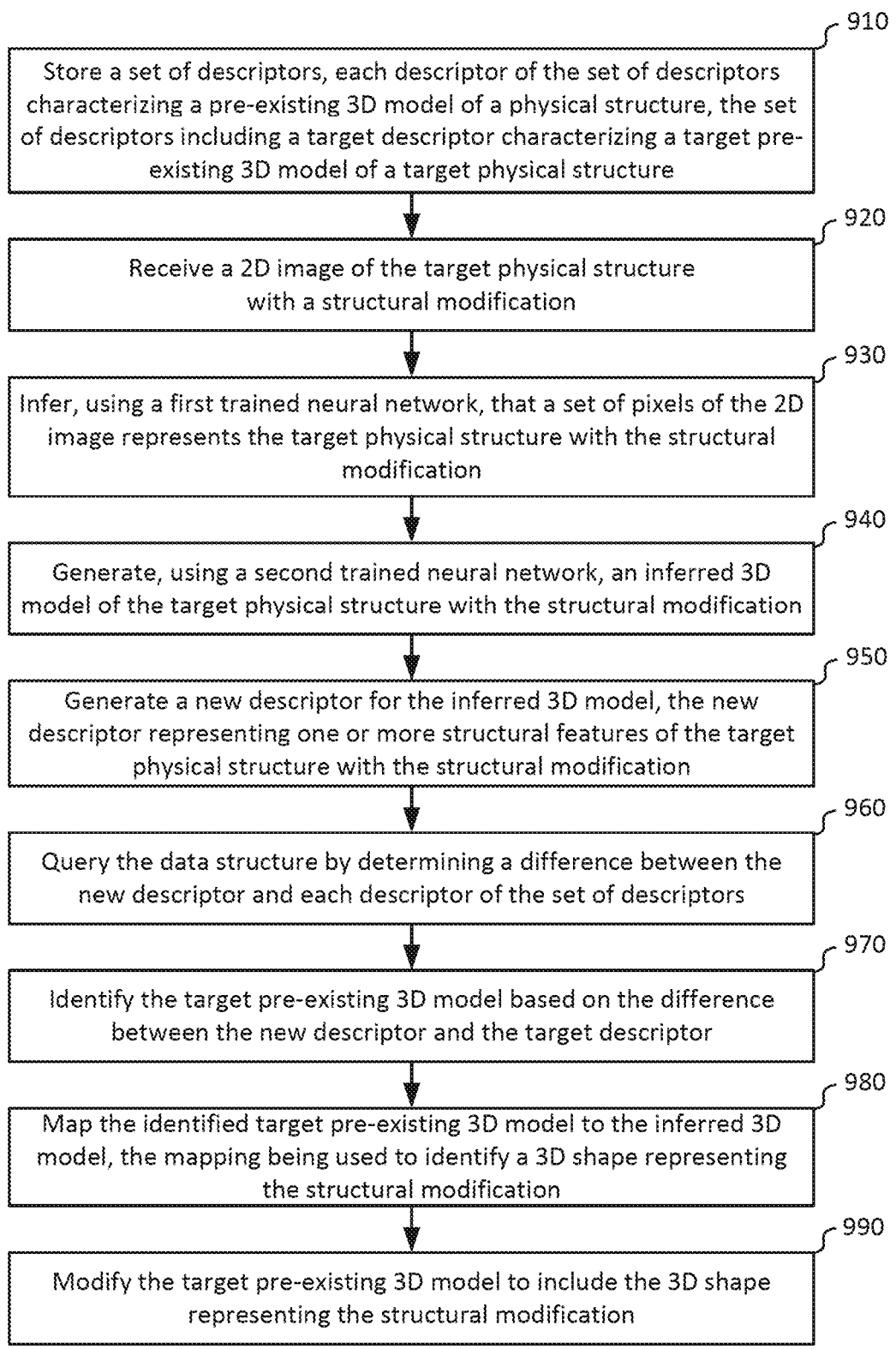
FIG. 9 is a flowchart illustrating a process for querying a set of pre-existing 3D models to identify a target pre-existing 3D model, according to certain embodiments of the present disclosure.

FIG. 9 is a flowchart illustrating a process for querying a set of pre-existing 3D models to identify a target pre-existing 3D model, according to certain embodiments of the present disclosure. Process 900 may be performed by any of the components illustrated in at least FIGS. 1-2, such as, for example, image processing system 102 and/or model generation system 104. Process 900 may be performed to querying a set of pre-existing 3D models to identify a target pre-existing 3D model (e.g., the 3D model of a building before a remodeling was performed).

Process 900 begins at block 910, where a set of descriptors may be stored in a data structure. For example, the descriptors may be stored in database 206. The descriptors may be stored in a tree data structure. As a non-limiting example, the tree data structure may enable fast approximate nearest neighbor search (FANN) in sub-linear time (e.g., logarithmic time complexity). The organization of the branches or nodes in the tree data structure may be determined by the descriptors stored in the database. For example, the branches or nodes in the tree data structure may be determined based on the presence or non-presence of descriptors. Each descriptor of the set of descriptors may characterize a pre-existing 3D model of a physical structure. The set of descriptors may include a target descriptor characterizing a target pre-existing 3D model of a target physical structure. For example, the target physical structure may be a building before the building was remodeled.

At block 920, image processing system 102 may receive a 2D image of the target physical structure with a structural modification. For example, a building may have been remodeled. The 2D image may be of the remodeled building. At block 930, the image processing system 102 may be configured to infer, using a first trained neural network, that a set of pixels of the 2D image represents the target physical structure with the structural modification. For example, the first trained neural network may be a neural network trained to perform image segmentation of 2D images. The image segmentation may be performed to detect pixels that relate to a physical structure, such as a house. In some implementations, image processing system 102 may retrieve an existing 3D model (from a data store) of the target physical structure with the structural modification, instead of inferring a 3D model. At block 940, image processing system 102 may be configured to generate, using a second trained neural network, an inferred 3D model of the target physical structure with the structural modification. For example, the second trained neural network may be trained to infer 3D depths of 2D structural lines of houses. The training data set used to train the second neural network may include 2D images with labeled structural lines and each labeled structural line may be assigned a known 3D depth (corresponding to an edge of a 3D model). The mapping of 2D structural lines to known 3D depths (e.g., of houses) may be learned to predict the depths of 2D structural lines in test images. Other techniques for inferring 3D models from 2D images may be used, for example, certain techniques described above.

At block 950, image processing system 102 may be configured to generate a new descriptor for the inferred 3D model. The new descriptor may represent one or more structural features of the target physical structure with the structural modification. A descriptor may be a set of binary values (e.g., a bit) concatenated together. Each bit of a descriptor may represent a presence or absence of a primitive feature (e.g., presence of roofing) at a specific point on a building. At block 960, image processing system 102 may be configured to query the data structure by determining a difference between the new descriptor and each descriptor of the set of descriptors stored in database 206, for example. At block 970, image processing system 102 may identify the target pre-existing 3D model based on the difference between the new descriptor and the target descriptor. For example, the difference may be a Hamming distance, and if the Hamming distance between the new descriptor and the target descriptor is within a threshold, the corresponding physical structures may be the same, even though one may be a version of the physical structure with a structural modification.

At block 980, image processing system 102 may be configured to map the identified target pre-existing 3D model to the inferred 3D model. The mapping may be used to identify a 3D shape representing the structural modification. The mapping may include calculating overlapping metrics between the inferred 3D model and the target pre-existing 3D model. Non-limiting examples of overlapping metrics may include a Dice similarity coefficient, distances errors, a Hausdorff distance, and other suitable metrics. At block 990, image processing system 102 may be configured to modify the target pre-existing 3D model to include the 3D shape representing the structural modification. The target physical structure associated with the target pre-existing 3D model may not include the structural modification.

While the machine-readable medium or machine-readable storage medium is shown in an exemplary embodiment to be a single medium, the term "machine-readable medium" and "machine-readable storage medium" should betaken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the present disclosure to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list. Those of skill in the art will appreciate that the present disclosure may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative embodiments may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative embodiments may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the present disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the present disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the present disclosure be limited not by this detailed description, but rather by any claims that issue on an application based hereon. Accordingly, the disclosure of the embodiments of the present disclosure is intended to be illustrative, but not limiting, of the scope of the present disclosure, which is set forth in the following claims.

What is claimed is:

1. A computer-implemented method comprising:
    receiving at least one two-dimensional (2D) image of a building;
    generating a predicted 3D model of the building based on the at least one 2D image;
    generating a search descriptor of the predicted 3D model, wherein the search descriptor comprises a vector of binary values describing a presence or absence of structural features at specific locations on the building to represent the building geometry;
    querying a data structure storing a plurality of pre-existing descriptors, wherein each pre-existing descriptor characterizes a previously constructed 3D model of an associated physical structure; and
    identifying at least one previously constructed 3D model that is substantially similar to the predicted 3D model based on a difference between the search descriptor and the plurality of pre-existing descriptors.

2. The computer-implemented method of claim 1, wherein generating the search descriptor of the predicted 3D model comprises compressing the predicted 3D model relative to a camera perspective.

3. The computer-implemented method of claim 2, wherein the camera perspective comprises a top-down view.

4. The computer-implemented method of claim 1, wherein the search descriptor comprises a set of bits is generated with an auto-encoder network, and wherein each bit in the vector of binary values represents the presence or absence of a specific structural feature of the associated physical structure.

5. The computer-implemented method of claim 1, wherein the difference between the search descriptor and the plurality of pre-existing descriptors comprises a Hamming distance.

6. The computer-implemented method of claim 1, further comprising mapping the at least one previously constructed 3D model to the predicted 3D model.

7. The computer-implemented method of claim 6, further comprising modifying the at least one previously constructed 3D model according to a geometry of the predicted 3D model.

8. The computer-implemented method of claim 7, wherein the geometry of the predicted 3D model comprises a structural modification of the building as captured by the at least one 2D image.

9. A non-transitory computer-readable medium comprising instructions that, when executed by one or more processors, cause the one or more processors to perform operations comprising:
    receiving at least one two-dimensional (2D) image of a building;
    generating a predicted 3D model of the building based on the at least one 2D image;
    generating a search descriptor of the predicted 3D model, wherein the search descriptor comprises a vector of binary values describing a presence or absence of structural features at specific locations on the building to represent the building geometry;
    querying a data structure storing a plurality of pre-existing descriptors, wherein each pre-existing descriptor characterizes a previously constructed 3D model of an associated physical structure; and
    identifying at least one previously constructed 3D model that is substantially similar to the predicted 3D model based on a difference between the search descriptor and the plurality of pre-existing descriptors.

10. The non-transitory computer-readable medium of claim 9, wherein generating the search descriptor of the predicted 3D model comprises compressing the predicted 3D model relative to a camera perspective.

11. The non-transitory computer-readable medium of claim 10, wherein the camera perspective comprises a top-down view.

12. The non-transitory computer-readable medium of claim 9, wherein the search descriptor comprises a set of bits is generated with an auto-encoder network, and wherein each bit in the vector of binary values represents the presence or absence of a specific structural feature of the associated physical structure.

13. The non-transitory computer-readable medium of claim 12, wherein the building comprises a building, and each bit in the vector of binary values indicates the existence or absence of a specific structural feature of the building.

14. The non-transitory computer-readable medium of claim 9, wherein the operations further comprise:
mapping the at least one previously constructed 3D model to the predicted 3D model; and
modifying the at least one previously constructed 3D model according to a geometry of the predicted 3D model, wherein the geometry of the predicted 3D model comprises a structural modification of the building as captured by the at least one 2D image.

15. A system comprising:
one or more processors;
one or more memory devices storing instructions that, when executed by the one or more processors, cause the one or more processors to perform operations comprising:
receiving at least one two-dimensional (2D) image of a building;
generating a predicted 3D model of the building based on the at least one 2D image;
generating a search descriptor of the predicted 3D model, wherein the search descriptor comprises a vector of binary values describing a presence or absence of structural features at specific locations on the building to represent the building geometry;
querying a data structure storing a plurality of pre-existing descriptors, wherein each pre-existing descriptor characterizes a previously constructed 3D model of an associated physical structure; and
identifying at least one previously constructed 3D model that is substantially similar to the predicted 3D model based on a difference between the search descriptor and the plurality of pre-existing descriptors.

16. The system of claim 15, wherein generating the search descriptor of the predicted 3D model comprises compressing the predicted 3D model relative to a camera perspective.

17. The system of claim 15, wherein the search descriptor comprises a set of bits is generated with an auto-encoder network, and wherein each bit in the vector of binary values represents the presence or absence of a specific structural feature of the associated physical structure.

18. The system of claim 15, wherein the difference between the search descriptor and the plurality of pre-existing descriptors comprises a Hamming distance.

19. The system of claim 15, wherein the operations further comprise:
mapping the at least one previously constructed 3D model to the predicted 3D model; and
modifying the at least one previously constructed 3D model according to a geometry of the predicted 3D model, wherein the geometry of the predicted 3D model comprises a structural modification of the building as captured by the at least one 2D image.

* * * * *